United States Patent
Stokely et al.

(10) Patent No.: US 12,037,892 B2
(45) Date of Patent: Jul. 16, 2024

(54) METHODS AND SYSTEMS EMPLOYING A CONTROLLED ACOUSTIC SOURCE AND DISTRIBUTED ACOUSTIC SENSORS TO IDENTIFY ACOUSTIC IMPEDANCE BOUNDARY ANOMALIES ALONG A CONDUIT

(71) Applicant: Halliburton Energy Services, Inc., Houston, TX (US)

(72) Inventors: Christopher Lee Stokely, Houston, TX (US); John L. Maida, Houston, TX (US); Neal Gregory Skinner, Lewisville, TX (US); Andreas Ellamauthaler, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 315 days.

(21) Appl. No.: 15/569,464

(22) PCT Filed: May 29, 2015

(86) PCT No.: PCT/US2015/033377
§ 371 (c)(1),
(2) Date: Oct. 26, 2017

(87) PCT Pub. No.: WO2016/195645
PCT Pub. Date: Dec. 8, 2016

(65) Prior Publication Data
US 2018/0087372 A1    Mar. 29, 2018

(51) Int. Cl.
*E21B 47/095*    (2012.01)
*E21B 47/001*    (2012.01)
(Continued)

(52) U.S. Cl.
CPC .......... *E21B 47/095* (2020.05); *E21B 47/001* (2020.05); *E21B 47/107* (2020.05);
(Continued)

(58) Field of Classification Search
None
See application file for complete search history.

(56) References Cited

U.S. PATENT DOCUMENTS 2,426,918 A * 9/1947 Barret ..................... G01V 3/12
                                                    324/335
2,724,453 A * 11/1955 Lee ........................ G01V 1/003
                                                    367/40
(Continued)

FOREIGN PATENT DOCUMENTS

| GB | 2405929 A | * | 3/2005 | ............... G01V 1/44 |
| GB | 2418732 A | * | 4/2006 | ............... G01V 1/44 |
| WO | 2016195645 A1 | | 12/2016 | |

OTHER PUBLICATIONS

Chudy, Steve, Gordon Mcintyre, and Paul Schuh. "Cased hole acoustic logging—a solution to a problem." SPWLA 36th Annual Logging Symposium. Society of Petrophysicists and Well-Log Analysts, 1995. (Year: 1995).*

(Continued)

*Primary Examiner* — Isam A Alsomiri
*Assistant Examiner* — Jonathan D Armstrong
(74) *Attorney, Agent, or Firm* — Thomas Rooney; Parker Justiss, P.C.

(57) ABSTRACT

A system includes a controlled acoustic source. The system also includes distributed acoustic sensors along a conduit. The distributed acoustic sensors obtain acoustic signal measurements as a function of position along the conduit in response to at least one acoustic signal provided by the controlled acoustic source. The system also includes a processing unit that generates an acoustic activity plot or (Continued)

report based on the acoustic signal measurements. The acoustic activity plot or report is used to identify at least one acoustic impedance boundary anomaly as a function of position along the conduit.

14 Claims, 8 Drawing Sheets

(51) Int. Cl.
| | |
|---|---|
| *E21B 47/107* | (2012.01) |
| *G01S 7/52* | (2006.01) |
| *G01S 7/54* | (2006.01) |
| *G01S 7/56* | (2006.01) |
| *G01S 15/86* | (2020.01) |
| *G01S 15/89* | (2006.01) |
| *G06T 5/00* | (2024.01) |

(52) U.S. Cl.
CPC ............ *G01S 7/52004* (2013.01); *G01S 7/54* (2013.01); *G01S 7/56* (2013.01); *G01S 15/86* (2020.01); *G01S 15/89* (2013.01); *G06T 5/00* (2013.01); *G06T 2207/20061* (2013.01)

(56) References Cited

U.S. PATENT DOCUMENTS

| | | | | |
|---|---|---|---|---|
| 2,794,965 | A * | 6/1957 | Yost | G01V 1/288 367/46 |
| 3,622,965 | A * | 11/1971 | Wu | G01V 1/306 367/47 |
| 4,617,518 | A * | 10/1986 | Srnka | G01V 3/06 324/365 |
| 4,817,061 | A * | 3/1989 | Alford | G01V 1/284 367/75 |
| 5,136,552 | A * | 8/1992 | Kelly | G01V 1/306 367/38 |
| 5,269,309 | A * | 12/1993 | Fort | G01H 5/00 600/447 |
| 5,311,484 | A * | 5/1994 | Anderson | G01V 1/28 367/37 |
| 5,798,982 | A * | 8/1998 | He | G01V 1/306 367/28 |
| 5,859,811 | A * | 1/1999 | Miller | G01V 1/48 367/25 |
| 6,014,344 | A * | 1/2000 | Baker, III | G01V 1/28 367/38 |
| 6,058,073 | A * | 5/2000 | VerWest | G01V 1/28 367/31 |
| 6,058,074 | A * | 5/2000 | Swan | G01V 1/362 367/21 |
| 6,640,900 | B2 * | 11/2003 | Smith | E21B 47/001 166/336 |
| 7,555,391 | B2 * | 6/2009 | Gleitman | E21B 47/12 702/9 |
| 9,651,711 | B1 * | 5/2017 | Olsson | E21B 47/002 |
| 2002/0092701 | A1 * | 7/2002 | Norris | G01V 1/40 181/102 |
| 2003/0193838 | A1 * | 10/2003 | Dunn | G01V 1/345 367/68 |
| 2004/0098200 | A1 * | 5/2004 | Wentland | G01V 1/34 702/2 |
| 2005/0075790 | A1 * | 4/2005 | Taner | G01V 1/288 702/14 |
| 2008/0019216 | A1 | 1/2008 | Leggett, III et al. | |
| 2009/0022010 | A1 * | 1/2009 | West | G01V 1/143 367/38 |
| 2010/0165791 | A1 * | 7/2010 | Lie | G01V 1/306 367/49 |
| 2011/0137568 | A1 * | 6/2011 | Bradley | G01V 9/007 702/11 |
| 2012/0063267 | A1 | 3/2012 | Hill et al. | |
| 2012/0155508 | A1 | 6/2012 | Dria et al. | |
| 2013/0058193 | A1 * | 3/2013 | Roberts | G01V 1/44 367/35 |
| 2013/0167628 | A1 | 7/2013 | Hull et al. | |
| 2014/0036628 | A1 | 2/2014 | Hill et al. | |
| 2014/0111209 | A1 * | 4/2014 | Gao | G01V 3/26 324/332 |
| 2014/0118350 | A1 * | 5/2014 | Imhof | G06T 15/08 345/424 |
| 2014/0126325 | A1 * | 5/2014 | Farhadiroushan | E21B 47/135 367/35 |
| 2014/0204712 | A1 * | 7/2014 | Skinner | E21B 47/135 367/81 |
| 2015/0233236 | A1 * | 8/2015 | Johnston | G01V 1/226 73/152.16 |
| 2016/0146661 | A1 * | 5/2016 | Martin | G01V 1/52 356/482 |
| 2016/0320509 | A1 * | 11/2016 | Almuhaidib | G01V 1/306 |
| 2017/0248012 | A1 * | 8/2017 | Donderici | E21B 49/00 |
| 2017/0371050 | A1 * | 12/2017 | Sun | G01V 1/003 |
| 2018/0188401 | A1 * | 7/2018 | Donderici | E21B 49/003 |
| 2019/0137640 | A1 * | 5/2019 | Park | G01S 15/88 |

OTHER PUBLICATIONS

Daley, Thomas M., et al. "Field testing of fiber-optic distributed acoustic sensing (DAS) for subsurface seismic monitoring." The Leading Edge 32.6 (2013): 699-706. (Year: 2013).*

Chan, Judith, and Douglas R. Schmitt. "Initial seismic observations from a deep borehole drilled into the Canadian Shield in northeast Alberta." International Journal of Earth Sciences 104.6 (2014): 1549-1562. (Year: 2014).*

Huang, Kou-Yuan, et al. "Syntactic pattern recognition and Hough transformation for reconstruction of seismic patterns." Geophysics 52.12 (1987): 1612-1620. (Year: 1987).*

Huang, Kou-Yuan, et al. "Hough transform neural network for seismic pattern detection." International Conference on Neural Information Processing. Springer, Berlin, Heidelberg, 2006. (Year: 2006).*

Huang, Kou-Yuan, et al. "Hough transform neural network for pattern detection and seismic applications." Neurocomputing 71.16-18 (2008): 3264-3274. (Year: 2008).*

Stokoe, Kenneth H., et al. Deep Downhole Seismic Testing for Earthquake Engineering Studies. No. PNNL-SA-62393. Pacific Northwest National Lab.(PNNL), Richland, WA (United States), 2008. (Year: 2008).*

* cited by examiner

METHODS AND SYSTEMS EMPLOYING A CONTROLLED ACOUSTIC SOURCE AND DISTRIBUTED ACOUSTIC SENSORS TO IDENTIFY ACOUSTIC IMPEDANCE BOUNDARY ANOMALIES ALONG A CONDUIT

CROSS-REFERENCE TO RELATED APPLICATION

This application is the National Stage of, and therefore claims the benefit of, International Application No. PCT/US2015/033377 filed on May 29, 2015, entitled "METHODS AND SYSTEMS EMPLOYING A CONTROLLED ACOUSTIC SOURCE AND DISTRIBUTED ACOUSTIC SENSORS TO IDENTIFY ACOUSTIC IMPEDANCE BOUNDARY ANOMALIES ALONG A CONDUIT," which was published in English under International Publication Number WO 2016/195645 on Dec. 8, 2016. The above application is commonly assigned with this National Stage application and is incorporated herein by reference in its entirety.

BACKGROUND

Hydrocarbon exploration and production involves drilling and completing a network of wells for conveying fluids uphole (production wells) or downhole (injection wells). To protect the integrity of a drilled well and to provide one or more fluid paths, casings (or liners) are often deployed in a well. Over time, casings can be degraded (due to corrosion) or blocked (due to deposits forming). Further, downhole operations sometimes lead to objects being stuck or lost along a cased wellbore.

Monitoring a cased wellbore over time and/or correcting for corrosion, blockages, or stuck/lost objects is an ongoing challenge. Well inspection can be performed, for example, by lowering or raising a specialized tool along a cased well. Such specialized tools may employ, for example, cameras, calipers, acoustic logging tools, or electromagnetic logging tools to characterize the profile or thickness of a casing. However, for long and/or deviated wells, specialized tool deployment is problematic due to limited and variable clearance between the casing and the specialized tool. Further, a single obstacle or profile anomaly can prevent inspection further along the cased well.

Another option to monitor a cased wellbore over time involves distributed sensors. Previous proposals include deploying distributed sensors along a cased wellbore to monitor acoustic activity related to fluid flow. While fluid flow monitoring could possibly identify leaks along a cased wellbore, it is not effective in scenarios where fluid flow is restricted (e.g., pump off, blockages, stuck/lost objects).

BRIEF DESCRIPTION OF THE DRAWINGS

Accordingly, there are disclosed herein methods and systems employing a controlled acoustic source and distributed acoustic sensors to identify acoustic impedance boundary anomalies along a conduit. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems employing a controlled acoustic source and distributed acoustic sensors to identify acoustic impedance boundary anomalies along a conduit. In different embodiments, a controlled acoustic source may be attached to the conduit or may be positioned near the conduit (e.g., at earth's surface, underwater, or along the trajectory of the conduit). Example controlled acoustic sources include striking a conduit with a hammer or heavy object, a pneumatic sound source (e.g., air gun or water gun), a piezoelectric transducer, or other available acoustic sources. In different embodiments, triggering of the controlled acoustic source may involve manual operations (e.g., an operator striking the conduit, pushing a button, or entering a command) or automation (e.g., a controller or computer sending a command in accordance with a predetermined schedule or trigger event). The controlled acoustic source provides one or more acoustic signals that propagate along the conduit and reflections will occur at acoustic impedance boundaries. While some acoustic impedance boundaries are expected (e.g., known diameter changes or hardware along a conduit), other acoustic impedance boundaries correspond to anomalies (e.g., deposits along the conduits, corrosion along the conduit, blockages, or stuck/lost objects).

As described herein, distributed acoustic sensors are deployed along the conduit to measure acoustic activity in response to one or more acoustic signals provided by the controlled acoustic source. The distributed acoustic sensors may be deployed inside a conduit, outside a conduit, or within a conduit wall. Examples of distributed acoustic sensors include piezoelectric transducers, distributed fiber Bragg gratings, an optical fiber, and/or other acoustic sensor options. For optical sensing arrangements, Fabry-Perot, Michelson, Mach-Zehnder, and/or Sagnac architectures can be used. The acoustic signal measurements obtained by distributed acoustic sensors in response to at least one acoustic signal provided by the controlled acoustic source are provided to a processing unit (e.g., a computer executing software) for analysis. For example, the processing unit may generate an acoustic activity plot or report (e.g., any combination of parameters, values, charts, etc.) based on the acoustic signal measurements. The acoustic activity plot or report is used to identify at least one acoustic impedance boundary anomaly as a function of position along the conduit. In some cases, visual inspection of an acoustic activity plot (e.g., a waterfall plot) may be sufficient to identify an acoustic impedance boundary anomaly. In addition, various data processing options may be employed to enhance visualization, identification, and/or tracking of acoustic impedance boundary anomalies. For example, in different embodiments, the processing unit performs a matched filtering operation and/or an image processing operation to generate or enhance the acoustic activity plot or report.

As used herein, the term "matched filtering" refers to data filtering that involves use of a known or determinable signature to distinguish a signal of interest from noise. As an example, matched filtering may involve storing or obtaining an acoustic signature corresponding to signals emitted by a controlled acoustic source. In at least some embodiments, matched filtering involves performing a cross-correlation or semblance analysis to determine the extent to which acoustic signal measurements collected by distributed acoustic sensors match the acoustic signature. The result of matched filtering may be match likelihood values that can be used to enhance an acoustic activity plot or report. With or without matched filtering, image processing operations may be performed to facilitate identification of reflection lines and/or bifurcation points associated with acoustic impedance boundary anomalies. As an example, a Hough transformation can be used to detect lines that are otherwise difficult to ascertain in an acoustic activity plot.

In at least some embodiments, one or more acoustic impedance boundaries with known positions along a conduit can be used to calibrate an acoustic velocity value related to an observed acoustic signal that matches an acoustic signature. Additionally or alternatively, the acoustic velocity value can be estimated based on fluids in the conduit, conduit compliance, and/or other factors. With a known or determinable acoustic velocity value, the position of acoustic impedance boundary anomalies can be accurately determined. Once the position of acoustic impedance boundary anomalies is determined, anomaly tracking and well intervention operations can be performed. For example, acoustic impedance boundary anomalies can be monitored over time using the techniques described herein, and well intervention operations may be initiated in response to an acoustic impedance boundary anomaly exceeding a volume or volume rate of change threshold.

In at least some embodiments, an example system includes a controlled acoustic source. The system also includes distributed acoustic sensors along a conduit, where the distributed acoustic sensors obtain acoustic signal measurements as a function of position along the conduit in response to at least one acoustic signal output by the controlled acoustic source. The system also includes a processing unit that generates an acoustic activity plot or report based on the acoustic signal measurements. The acoustic activity plot or report is used to identify at least one acoustic impedance boundary anomaly as a function of position along the conduit.

Meanwhile, in at least some embodiments, an example method includes obtaining acoustic signal measurements as a function of position along a conduit using a controlled acoustic source and distributed acoustic sensors. The method also includes generating an acoustic activity plot or report based on the acoustic signal measurements. The method also includes identifying at least one acoustic impedance boundary anomaly as a function of position along the conduit based on the acoustic activity plot or report. Various controlled acoustic source options, distributed acoustic sensor options, and data analysis options to identify, track, and/or visualize acoustic impedance boundary anomalies along a conduit are described herein.

Figure 1:
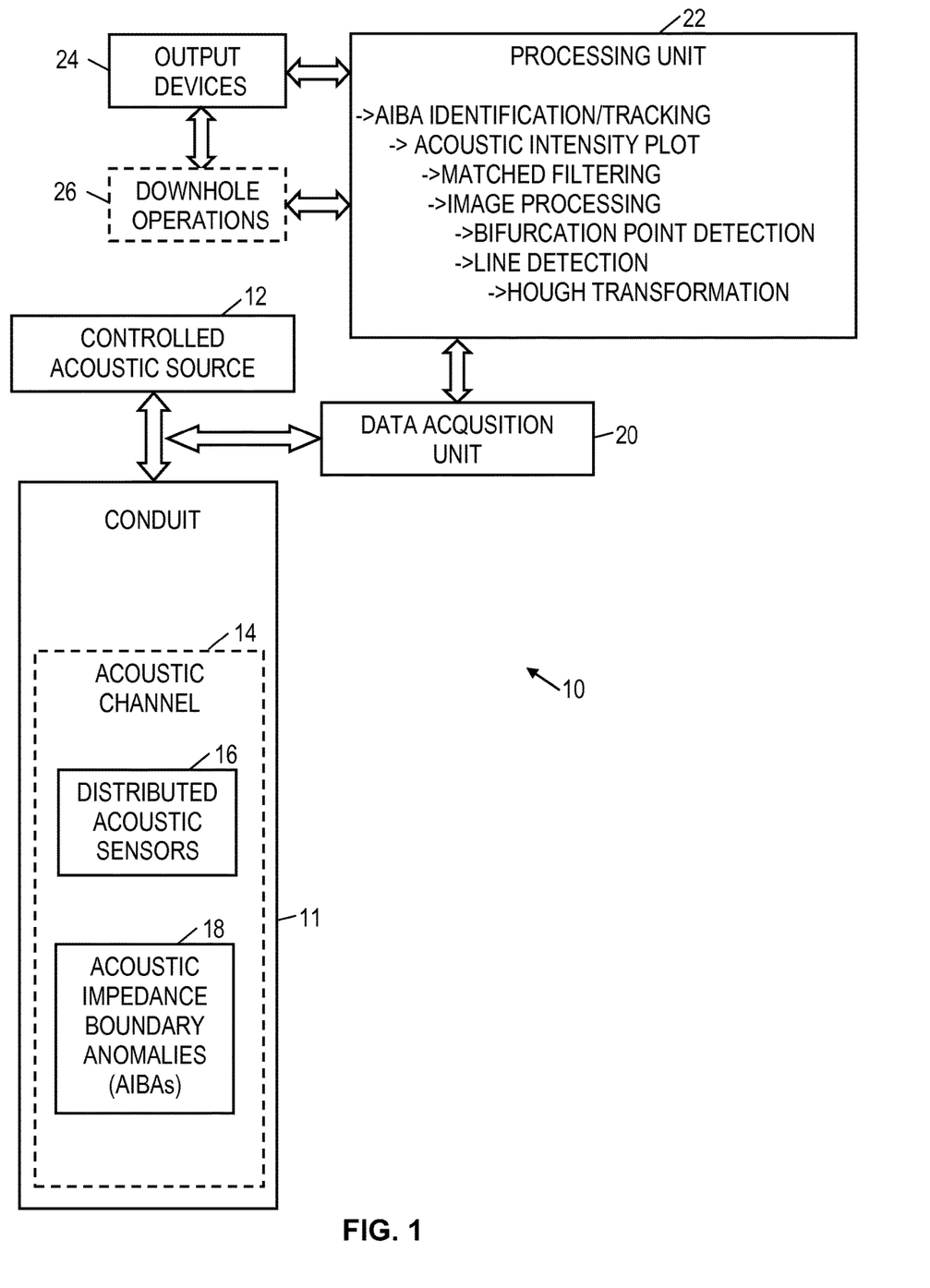
FIG. 1 is a block diagram showing an illustrative system.

The disclosed techniques are best understood in an application context. Turning now to the figures, FIG. 1 is a block diagram of an illustrative system 10. As shown, system 10 includes a conduit 11 having an acoustic channel 14 with distributed acoustic sensors 16 and acoustic impedance boundary anomalies (AIBAs) 18. In different embodiments, the conduit 11 may correspond to a cased wellbore, a subsea pipe or tubular, or another fluid conduit. Meanwhile, the acoustic impedance boundary anomalies 18 may correspond to unexpected changes in the conduit diameter (e.g., due to corrosion or deposits) and/or unexpected objects along the conduit. In different embodiments, the conduit 11 may include one or more vertical portions, deviated portions, or horizontal portions.

To identify or track the acoustic impedance boundary anomalies 18, the controlled acoustic source 12 provides an acoustic signal with a known or determinable acoustic signature to the acoustic channel 14. In different embodiments, the controlled acoustic source 12 may correspond to, for example, a hammer strike at a wellhead, a pneumatic sound source (e.g., air gun or water gun), a piezoelectric transducer, or other available acoustic sources. The controlled acoustic source 12 may be deployed near or within the conduit 11. In some embodiments, the controlled acoustic source 12 is located at earth's surface to facilitate its deployment and operation by an operator. Alternatively, the controlled acoustic source 12 is located at a known position along a conduit 11. In different embodiments, the acoustic source 12 may be attached to an interior or exterior of a conduit, an adapter or coupler between conduit segments, a wellhead, or a conduit in communication with a wellhead.

The acoustic signal provided by the controlled acoustic source 12 will propagate through acoustic channel 14 and will be detected by the distributed acoustic sensors 16. Further, acoustic impedance boundaries along the conduit 11 will result in reflections of the acoustic signal, where the reflections are also detected by the distributed acoustic sensors 16. While the acoustic signal and related reflections will attenuate over time, the distributed acoustic sensors 16 will be able to collect meaningful measurements (before attenuation result in a signal-to-noise ratio that prevent analysis). The measurements collected by the distributed acoustic sensors 16 are conveyed to a data acquisition unit 20. For example, in a distributed acoustic sensing (DAS) scenario, the data acquisition unit 20 may provide an optical interrogation signal, receive backscattered light, and perform interferometry operations, where recovered phase information can be correlated with acoustic activity along the conduit 11.

In system 10, a processing unit 22 is in communication with the data acquisition unit 20 and receives the measurements collected by the distributed acoustic sensors 16 and/or values derived from such measurements. The processing unit 22 may correspond to, for example, one or more computers that execute software instructions to perform acoustic activity analysis based on measurements collected by the distributed acoustic sensors 16. The analysis performed by the processing unit 22 results in an acoustic activity plot or report that enables the acoustic impedance boundary anomalies 16 to be identified, tracked, and/or visualized. In at least some embodiments, the acoustic activity plot or report is generated or enhanced using a matched filtering operation. For the matched filtering operation, an acoustic signature of a source signal (e.g., from controlled acoustic source 12) is used to distinguish the source signal (or related reflections) from other acoustic activity along the conduit 11. Further, a map of known acoustic impedance boundaries (e.g., a casing string schematic that records casing diameter changes or the location of casing jewelry) can be used to distinguish between expected reflections (due to known acoustic impedance boundaries) and unexpected reflections (due to anomalies). In at least some embodiments, the matched filtering operation results in match likelihood values that can be used to generate or enhance an acoustic activity plot or report. As an example, an acoustic activity plot may represent acoustic intensity using different colors or shades as a function of position and time.

Another option to generate or enhance an acoustic activity plot or report involves image processing. Accordingly, in at least some embodiments, the processing unit 22 performs image processing to facilitate identification of bifurcation points or reflection lines associated with acoustic impedance boundary anomalies. Such image processing can be applied with or without matched filtering. In at least some embodiments, the image processing operations performed by the processing unit 22 involve a Hough transformation to identify bifurcation points or reflection lines associated with acoustic impedance boundary anomalies. Again, a map of known acoustic impedance boundaries (e.g., a casing string schematic that records casing diameter changes or the location of casing jewelry) can be used to distinguish between expected reflections (due to known acoustic impedance boundaries) and unexpected reflections (due to anomalies).

In at least some embodiments, the processing unit 22 is in communication with output devices such as monitors, network interfaces, or printers. Accordingly, information regarding acoustic impedance boundary anomalies identified by the processing unit 22 may be provided to output devices 24. The information may be in the form of an acoustic activity plot, a report, a representation of the conduit 11 and objects causing reflections along the conduit 11, graphs, estimated anomaly volumes, estimated anomaly volume rates of change as a function of time, and/or other information. In some embodiments, an operator may review the information provided to the output devices 24 as part of real-time monitoring operations. Alternatively, such information may be provided periodically or in accordance with triggers or thresholds. For example, if an estimated anomaly volume or volume rate of change exceeds a threshold, a warning can be triggered, where the warning provides relevant information to an operator. In response to anomaly warnings or related information, downhole operations 26 may be performed to address identified anomalies. For example, the downhole operations 26 may involve deploying a conduit intervention tool to "fish" an object, to remove deposits, and/or to adjust a conduit profile. Additionally or alternatively, a fluid treatment may be initiated to reduce or eliminate an anomaly.

Figure 2A:
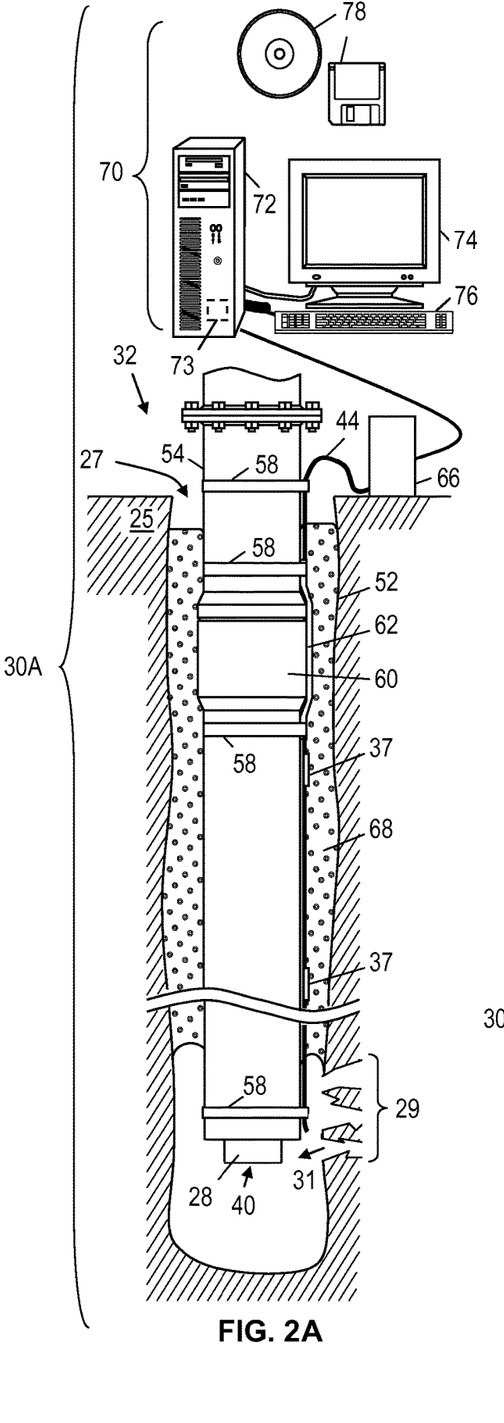
FIGS. 2A-2C are schematic diagrams showing optical distributed sensing well environments.
Figure 2B:
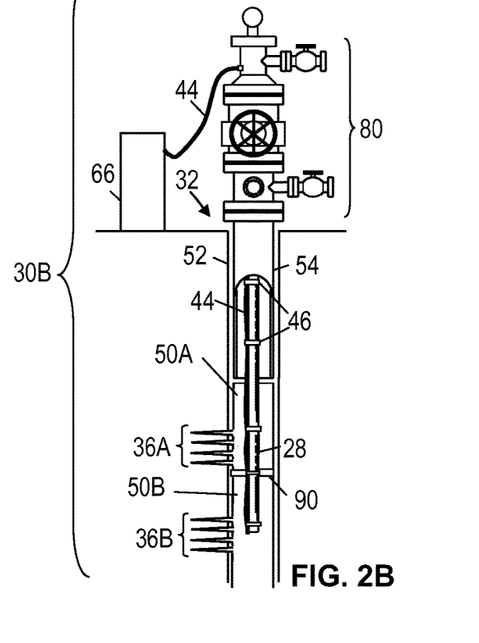
Figure 2C:
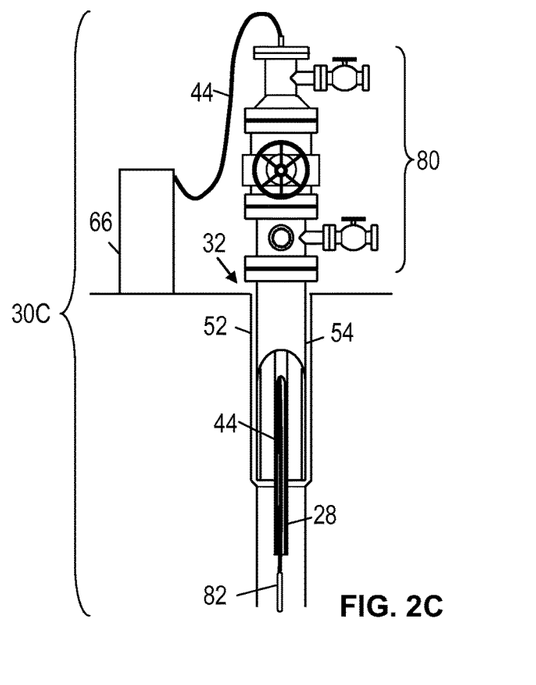

FIGS. 2A-2C show illustrative optical distributed sensing well environments 30A-30C which may correspond to different embodiments of system 10 discussed in FIG. 1. In well environment 30A, a drilling rig has been used to drill and complete well 32 in a typical manner, with a casing string 54 positioned in the borehole 27 that penetrates into the earth 25. The casing string 54 includes multiple tubular casing sections (usually about 30 feet long) connected end-to-end by couplings 60. Note: FIG. 2A is not to scale, and casing string 54 may include many of such couplings 60. Within the well 32, a cement slurry 68 has been injected into the annular space between the outer surface of the casing string 54 and the inner surface of the borehole 52 and allowed to set. Further, a production tubing string 28 has been positioned in an inner bore of the casing string 54. The well 32 is adapted to guide a desired fluid (e.g., oil or gas) from a bottom of the borehole 52 to a surface of the earth 25. Perforations 29 have been formed at a bottom of the borehole 52 to facilitate the flow of a fluid 31 from a surrounding formation into the borehole 52 and thence to the surface via an opening 40 at the bottom of the production tubing string 28. Note that this well configuration is illustrative and not limiting on the scope of the disclosure. For example, fluid flow to or from a formation is possible at other points along the well 32 (not only at the bottom). Further, the well 32 may correspond to a production well or injection well. Alternatively, optical distributed sensing as described herein may be deployed with a monitoring well.

The optical distributed sensing well environment 30A includes various components to collect and analyze acoustic measurements, including an interface 66 coupled to a fiber optic cable 44. The interface 66 is located on the surface of the earth 25 near the wellhead (i.e., a "surface interface") and may correspond to data acquisition unit 20 of FIG. 1. In FIG. 2A, the fiber optic cable 44 extends along an outer surface of the casing string 54 and is held against the outer surface of the casing string 54 at spaced apart locations by multiple bands 58 that extend around the casing string 54. A protective covering 62 may be installed over the fiber optic cable 44 at each of the couplings 60 of the casing string 54 to prevent the fiber optic cable 44 from being pinched or sheared by the coupling's contact with the wall of borehole 52. The protective covering 62 may be held in place, for example, by two of the bands 58 installed on either side of coupling 60.

In at least some embodiments, the fiber optic cable 44 terminates at surface interface 66 with an optical port adapted for coupling the fiber(s) in cable 44 to a light source and a detector. The light source transmits light pulses along the fiber optic cable 44, which contains a fiber with scattering impurities. As each pulse of light propagates along the fiber, some of the pulse is scattered back along the fiber from every point on the fiber. Thus the entire fiber acts as a distributed sensor. The optical port of the surface interface 66 communicates backscattered light to the detector, which responsively produces interferometry measurements from backscattered light attributes (e.g., phase or phase shift) corresponding to different points along the fiber optic cable 44. From the recovered phase information, the acoustic activity sensed by the fiber at the location of the backscatter can be determined.

As shown, the optical distributed sensing well environment 30A also includes a computer 70 coupled to the surface interface 66 to control the light source and detector. The illustrated computer 70 includes a chassis 72 with at least one processing unit 73. Further the computer 70 includes an output device 74 (e.g., a monitor as shown in FIG. 3A, or a printer), an input device 76 (e.g., a keyboard), and non-transient information storage media 78 (e.g., magnetic or optical data storage disks). It should be appreciated that the computer 70 may be implemented in different forms including, for example, an embedded computer permanently installed as part of the surface interface 66, a portable computer that is plugged into or wirelessly linked to the surface interface 66 as desired to collect data, and a remote desktop computer coupled to the surface interface 66 via a wireless link and/or a wired computer network. In at least some embodiments, the computer 70 is adapted to receive the digitized interferometry signals from the surface interface 66 and to responsively determine acoustic activity values as a function of position along the length of the fiber optic cable 44 and time.

In at least some implementations, the non-transient information storage media 78 stores a software program for execution by computer 70. The instructions of the software program cause the computer 70 to recover phase information from digitized interferometry signals received from surface interface 66. With the recovered phase information, acoustic activity values at different points along the fiber optic cable 44 (e.g., every 2 meters) can be determined. The instructions of the software program may also cause the computer 70 to display information associated with acoustic activity values via the output device 74. Further, the instructions of the software program may also cause the computer 70 perform matched filtering and image processing operations to facilitate identifying, tracking, or visualizing acoustic impedance boundary anomalies as described herein. Further, volume identification/tracking, and/or volume rate of change identification/tracking related to impedance boundary anomalies can be performed. Further, the instructions of the software program may also cause the computer 70 to provide warnings, acoustic activity plots, reports, images, logs, charts, or other information to facilitate analysis of acoustic impedance boundary anomalies.

FIG. 2B shows an alternative optical distributed sensing well environment 30B, where the fiber optic cable 44 is strapped to the outside of the production tubing 28 rather than the outside of casing 54. Rather than exiting the well 32 from the annular space outside the casing 54, the fiber optic cable 44 exits through an appropriate port in "Christmas tree" 80 (i.e., the assembly of pipes, valves, spools, and fittings connected to the top of the well 32 to direct and control the flow of fluids to and from the well 32) and couples to surface interface 66, which may include optical interrogation and receiver components to perform interferometry analysis of backscattered light along fiber optic cable 44 as described herein. Further, a computer (e.g., computer 70) may receive digitized interferometry signals from surface interface 66, and may recover phase information and related acoustic activity information as described herein. The acoustic activity information may be processed using matched filtering and image processing as described herein to identify or track acoustic impedance boundary anomalies as described herein. Further, warnings, images, logs, charts, or other acoustic impedance boundary anomaly information obtained from analysis of available acoustic activity information may be stored and/or displayed.

In the optical distributed sensing well environment 30B, the fiber optic cable 44 extends along the outer surface of the production tubing string 28 and is held against the outer surface of the production tubing string 28 at spaced apart locations by multiple bands 46 that extend around the production tubing string 28. In some embodiments, a portion of the fiber optic cable 44 (a hanging tail) extends past the production tubing string 28. In the optical distributed sensing well environment 30B, two perforations 36A and 36B have been created in borehole 52 to facilitate obtaining formation fluids from two different zones 50A and 50B defined by a packer 90 that seals an annulus around the production tubing string 28. More specifically, formation fluid enters zone 50A and production tubing string 28 via the perforation 36A, while formation fluid enters zone 50B and production tubing string 28 via the perforation 36B. As shown, the fiber optic cable 44 extends through the different zones 50A and 50B to enable distributed sensing operations along well 32 including zones 50A and 50B. Although only two zones 50A and 50B are shown for optical distributed sensing well environment 30B, it should be appreciated that additional zones may be defined along well 32.

FIG. 2C shows an alternative optical distributed sensing well environment 20C, where the fiber optic cable 44 is suspended inside production tubing 28. A weight 82 or other conveyance mechanism is employed to deploy and possibly anchor the fiber optic cable 44 within the production tubing 28 to minimize risks of tangling and movement of the fiber optic cable 44 from its desired location. The fiber optic cable 44 exits the well 32 via an appropriate port in Christmas tree 80 and attaches to the surface interface 66. Again, surface interface 66 and a computer (e.g., computer 70) enables interferometry analysis of backscattered light along fiber optic cable 44 and recovery of phase information and related acoustic activity information. The acoustic activity information may be processed to generate an acoustic activity plot or report. As desired, matched filtering operations and/or image processing operations can be performed to generate or enhance an acoustic activity plot or report. The acoustic activity plot or report (e.g., warnings, images, logs, charts, or other acoustic impedance boundary anomaly information) obtained from analysis of available acoustic activity information may be stored and/or displayed.

Other alternative optical distributed sensing well environments employ composite tubing with one or more optical fibers embedded in the wall of the tubing. The composite tubing can be employed as the casing and/or the production string. Alternatively, a fiber optic cable such as cable 44 could be arranged inside or outside of normal, metallic coiled tubing. Further, a fiber optic cable such as cable 44 and a weighted section of transmission line may be run on the end of standard electric cable.

Figure 3:
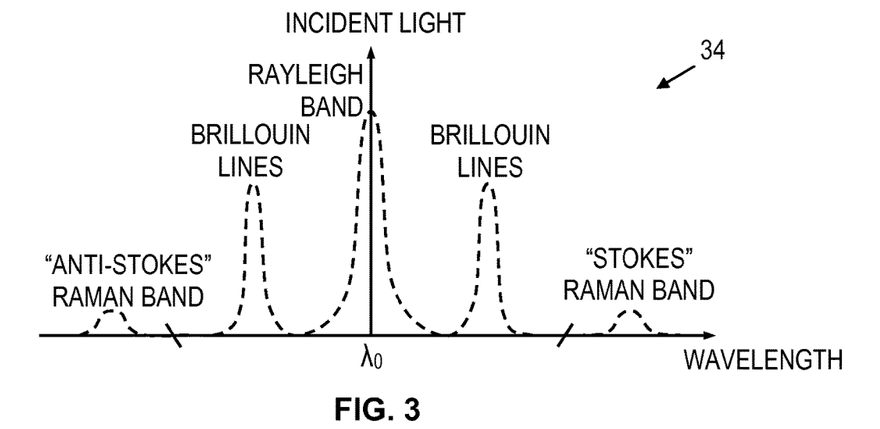
FIG. 3 is a graph showing optical intensity versus wavelength for various forms of optical backscattering.

FIG. 3 shows a graph 34 illustrating optical intensity versus wavelength for various forms of optical backscattering. At the center of the abscissa is the wavelength $\lambda_0$ of light initially launched into a waveguide. Rayleigh backscattering has the highest intensity and is centered at the wavelength $\lambda_0$. Rayleigh backscattering is due to microscopic inhomogeneities of refractive index in the waveguide material matrix. Note that Raman backscattering (which is due to thermal excited molecular vibration known as optical phonons) has an intensity which varies with temperature T, whereas Brillouin backscattering (which is due to thermal excited acoustic waves known as acoustic phonons) has a wavelength which varies with both temperature T and strain $\varepsilon$. Depending on the desired signal-to-noise ratio, fiber length, and desired accuracy, backscattered light measurements can be stacked over time (e.g., averaged), which results in an effective sample rate of from tens of seconds to several minutes. In at least some embodiments, acoustic activity along an optical fiber can be recovered by interferometric analysis of Brillouin backscattering.

Figure 4:
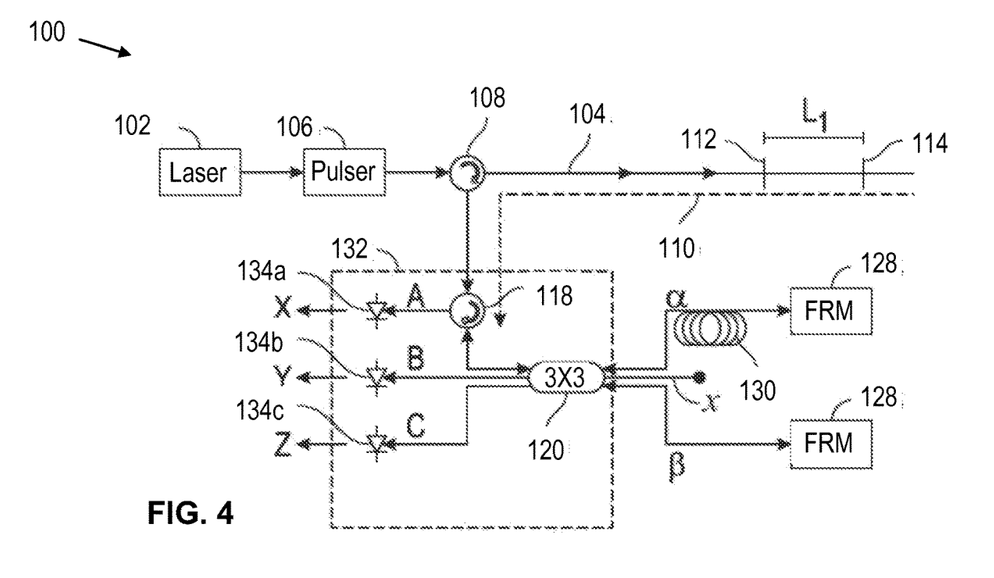
FIG. 4 is a schematic diagram showing an optical phase interferometric sensing arrangement.

FIG. 4 depicts an optical phase interferometric sensing arrangement 100, where most of the components represented in arrangement 100 (except fiber 104, which may extend along a cased well as described herein) could be part of data acquisition unit 20 in FIG. 1 or surface interface in FIGS. 2A-2C. The arrangement 100 includes a laser 102, or other light source, that generates an interrogation signal on a distributed sensing fiber 104. The laser 102 may provide a pulsed or non-pulsed interrogation signal. If a non-pulsed interrogation signal is output from the laser 102, a pulser 106 may be employed to pulse the interrogation signal. The pulsed interrogation signal may then interact with a first circulator 108 which couples the interrogation signal to the distributed sensing fiber 104. In some embodiments, a spread spectrum scheme is used, where a single light pulse is replaced by a continuous pseudorandom pulse train.

As each interrogation signal pulse travels through the distributed sensing fiber 104, a portion of the pulse energy is reflected due to reflective elements or imperfections along the distributed sensing fiber 104. For illustrative purposes, the reflected signal is depicted in FIG. 4 as return signal 110. In some embodiments, the return signal 110 may be generated from discrete reflective elements placed along the distributed sensing fiber 104, such as fiber Bragg gratings (FBGs) arranged at positions 112 and 114. Alternatively, in a DAS scenario, the return signal 110 may be generated from inherent reflection within the distributed sensing fiber 104 due to fiber imperfections (e.g., impurities). When such scattering occurs elastically, it may correspond to Rayleigh backscatter. In FIG. 4, the backscatter is depicted as occurring at the positions 112 and 114 along the distributed sensing fiber 104. However, those of skill in the art will recognize that there may be numerous other reflection points along the distributed sensing fiber 104.

The first circulator 108 additionally couples the return signal 110 to a receiver 132. In at least some embodiments, the receiver 132 includes a second circulator 118 which conveys the return signal 110 a 3×3 fiber optic coupler 120. The fiber optic coupler 120 distributes the return signal 110 across three paths labeled α, β, x. The x path is terminated with an absorber and is not used further. The α and β paths are each terminated with a Faraday rotator mirror (FRM) 128 that reflects the signals to the fiber optic coupler 120, albeit with a polarization reversal that compensates for any polarization-shifts inadvertently introduced along the α and β paths. A delay coil 130 is included in the α path to introduce a delay in the reflected signal relative to the signal reflected along the β path. Further, a dither signal or phase modulation may be introduced in either of the α or β paths to facilitate distributed sensing data recovery. The dither signal may be introduced, for example, by controlling the temperature of system components, controlling temperature along an optical fiber path, controlling strain along an optical fiber path, and/or otherwise controlling the environment of system components. Another way to introduce a dither signal is with a dither generator (e.g., based on lithium niobate). Further, it should be appreciated that arrangement 100 is only an example, and that a dither signal can be used for both heterodyne and homodyne interferometry. Further, in some embodiments, a dither signal may be applied before light pulses are conveyed to the optical fiber (e.g., fiber 104) used for distributed sensing.

Returning to the discussion of FIG. 4, the fiber optic coupler 120 combines the signals from the α and β (and the unused x) paths to form three optical interferometry signals A, B, C. The delay introduced between the α and β paths corresponds to the distance or "sensing window" L1 between the reflection points 112, 114 on the distributed sensing fiber 104, enabling the phase change incurred over this length to be measured and monitored as an interferometric signal phase. Due to the nature of the fiber optic coupler 120, the optical interferometry signals A, B, C have mutual phase separations of 120°. For example, as the α and β signals enter the 3×3 coupler 120, the interferometric signal A exiting the fiber optic coupler 120 may be α+β∠0°, B may be) α+(β∠+120°), and C may be α+(β∠−120°).

The optical phase interferometric sensing arrangement 100 also implements single-ended detectors 134a-134c, which receive the optical interferometry signals A, B, and C and provide outputs X, Y, Z from which the in-phase (I) and quadrature (Q) terms may be calculated as:

$$I = X + Y - 2Z = (3/2)(\cos[\phi] - \sqrt{3} \sin[\phi])P_\alpha P_\beta \quad (1)$$

$$Q = \sqrt{3}(X-Z) = (3/2)(\sqrt{3}\cos[\phi] + \sin[\phi])P_\alpha P_\beta \quad (2)$$

albeit with a coordinate rotation of −π/3. Taking this coordinate rotation into account gives the following equation for obtaining a phase from I/Q data:

$$\phi = \operatorname{ArcTan}\left[\frac{Q}{I}\right] + \left(\frac{\pi}{3}\right) \quad (3)$$

As an alternative to the 3×3 fiber optic coupler 120 and related operations, a so-called 90-degree optical hybrid can be employed which directly outputs the I/Q signals. For more information regarding optical phase demodulation using an optical phase interferometric sensing arrangement such as arrangement 100, reference may be had to International Application Number PCT/US14/19232, entitled "Interferometric High Fidelity Optical Phase Demodulation" and filed Feb. 28, 2014.

Figure 5:
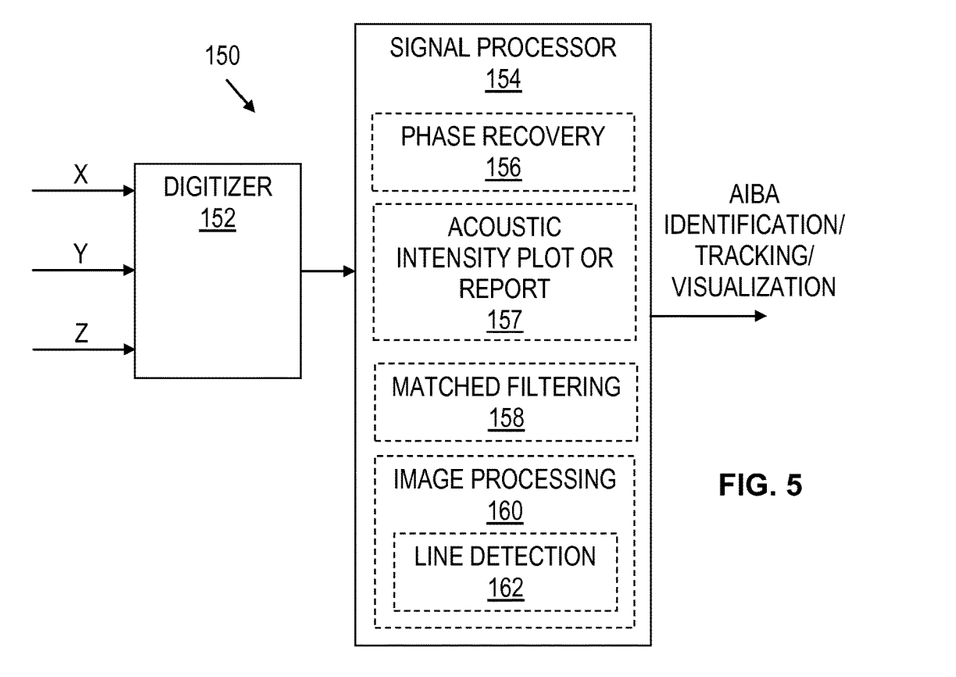
FIG. 5 is a block diagram showing a signal processing arrangement.

FIG. 5 shows an illustrative signal processing arrangement 150 having a digitizer 152 that digitizes signals such as X, Y, Z, and signal processor 154 that receives the digitized signals from the digitizer 152. In accordance with at least some embodiments, the signal processor 154 comprises a phase recovery module 156 (e.g., to perform quadrature demodulation of phase), acoustic intensity plot or report module 157, a matched filtering module 158, and an image processing module 160. For example, the signal processor 154 may correspond to one or more central processing unit (CPUs) or application-specific integrated circuits (ASICs) that execute software or firmware instructions corresponding to phase recovery module 156, acoustic intensity plot or report module 157, matched filtering module 158, and image processing module 160.

In at least some embodiments, the phase recovery module 156 enables recovery of phase data from interferometry sensing of backscattered light as described herein. Meanwhile, the acoustic intensity plot or report module 157 uses the phase data or related values to plot acoustic activity as a function of time and position. The acoustic activity plot may provide sufficient information to identify the position and possibly the volume of acoustic impedance boundary anomalies (a larger anomaly will generate a larger reflection). Additionally or alternatively to an acoustic activity plot, a report may be generated to facilitate identification, tracking, or visualization of acoustic impedance boundary anomalies. The report may include words, parameter values, charts, images, and/or other information derived from acoustic activity measurements collected by distributed acoustic sensors deployed along a conduit.

The matched filtering module 158 enables matched filtering operations to be performed. The matched filtering operations may be used to generate or enhance an acoustic activity plot or report. In at least some embodiments, the matched filtering module 158 stores or accesses an acoustic signature of a source signal associated with a controlled acoustic source to distinguish the source signal (or related reflections) from other acoustic activity along a deployed optical fiber (e.g., fiber 44). In at least some embodiments, filtered acoustic activity data or match likelihood values obtained by performing matched filtering operations are applied to acoustic activity plot or report.

The image processing module 160 enables changes to image data based on one or more rules. Such image processing can be applied in combination with or separate from the matched filtering operations. In at least some embodiments, the image processing module 160 stores or accesses a Hough transformation or other line detection instructions 162 to facilitate bifurcation point or reflection line detection associated with acoustic impedance boundary anomalies.

Without limitation, the techniques described herein to identify, track, and/or visualize acoustic impedance boundary anomalies can be applied to scenarios where deposits form along a conduit. Deposit formations such as paraffin wax, hydrates or scale are one of the principal flow assurance threats in the oil and gas industry. Such deposits tend to attack a number of elements within the production chain including valves, pumps, production pipes and casing, ultimately leading to a significant drop in the overall production rates. In addition, such deposits might cause undesirable pressure build-ups at certain points of the well due to obstructions in the equipment.

Figure 6:
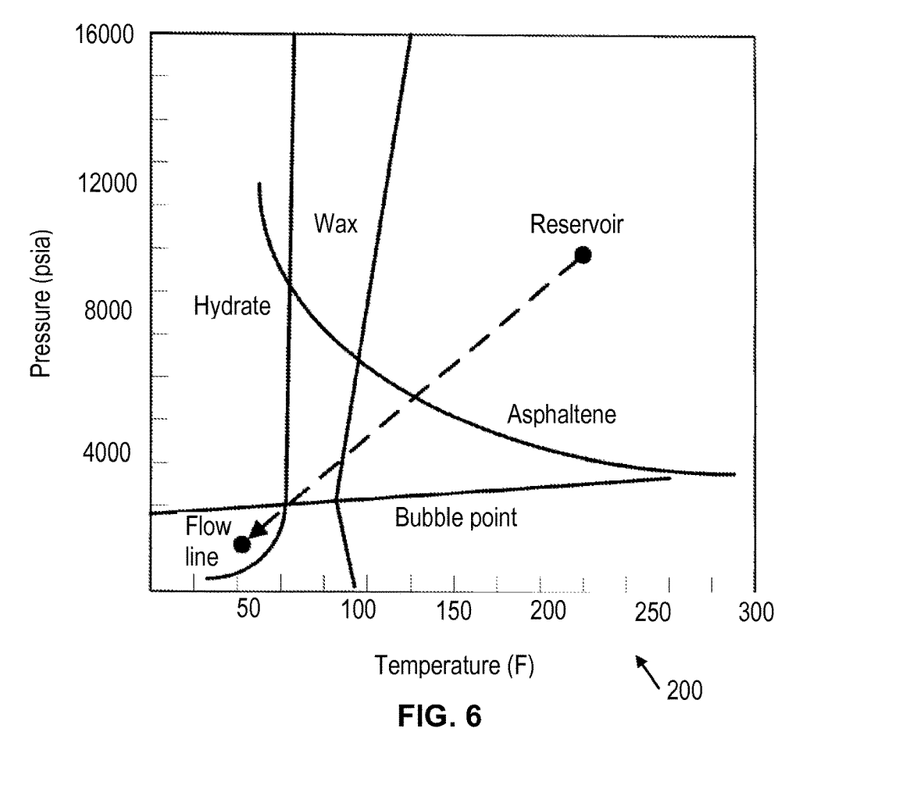
FIG. 6 is a chart showing wax and hydrate formation zones as a function of temperature and pressures.

Deposit formations are often the result of temperature and pressure changes of the formation fluid. Such conditions may appear in different production scenarios, such as when fluid transitions from reservoir to surface. FIG. 6 shows a pressure vs. temperature chart 200 with given reservoir and flow line conditions. In chart 200, it can be observed that depending on the prevailing temperature/pressure conditions, the fluid may pass through wax and hydrate formation zones causing the precipitation of these elements in the fluid.

Figure 7:
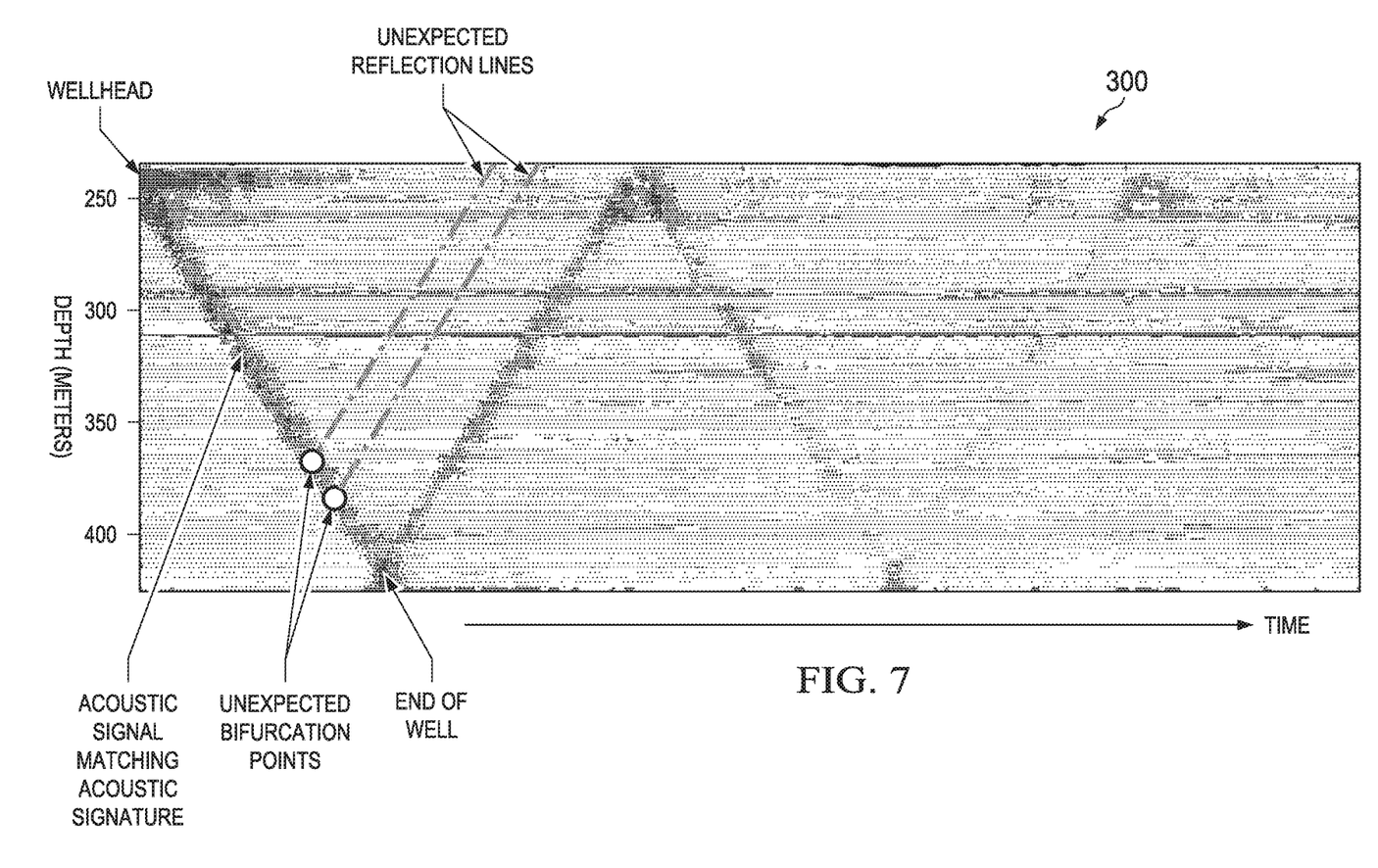
FIG. 7 is a graph plotting matched acoustic intensity as a function of depth and time.
Figure 8:
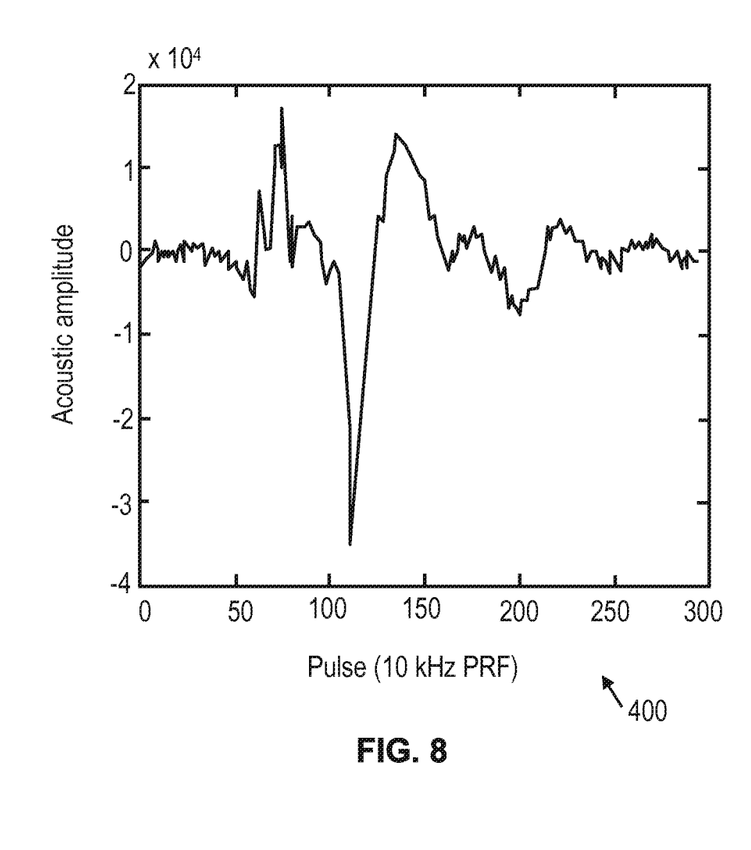
FIG. 8 is a graph plotting an illustrative acoustic signature generated by a hammer strike a wellhead.

FIG. 7 is a graph 300 plotting matched acoustic intensity as a function of depth and time. In graph 300, an acoustic signal matching an acoustic signature propagates between a wellhead and an end of well. An example acoustic signature is represented in FIG. 8, where graph 400 shows an acoustic signature for a hammer strike at a wellhead. In graph 400, the acoustic amplitude varies as a function of pulse, where a pulse repetition frequency (RPF) of 10 kHz is assumed. As long an acoustic signature is repeatable and/or available for measurement, the matched filtering operations described herein can be performed.

In at least some embodiments, acoustic activity analysis to identify/track/visualize acoustic impedance boundary anomalies involves the following operations:
 1. Generate a series of acoustic pulses in a pipe;
 2. Find the exact locations of the acoustic pulses within each DAS data channel using a matched filtering approach;
 3. Assemble the results of the matched filtering operation for each channel, resulting in an enhanced waterfall plot (see e.g., FIG. 7);
 4. Apply image processing techniques to find the bifurcation points of the primary reflections of an acoustic waveform travelling down the wellbore (or any other fiberized, tubular structure). These bifurcation points correspond to the points-of-origin of the reflections and consequently represent the exact positions of potential features of interest.

More specifically, for the acoustic pulse generation (operation 1), an active acoustic source emits a series of acoustic pulses with known signature. As these pulses travel down (or up) a well they provoke a strain change in a fiber optic cable deployed along the well, where the strain can be measured by means of DAS. The sections within the DAS data corresponding to the arrival of a single pulse can be clipped and stacked over time resulting in a DAS recording exhibiting the arrival of a single acoustic pulse with improved SNR. In order to perform temporal stacking a time-zero signal needs to be recorded that indicates the exact time each acoustic pulse was emitted.

For the matched filtering (operation 2), a template signal or acoustic signature (e.g., corresponding to an acoustic waveform generated at the wellhead and sent downhole) is cross-correlated with the observed DAS data stream of each channel. The resulting cross-correlation is high whenever the generated acoustic waveform is present in the data stream ultimately reaching its maximum at the exact positions of the acoustic pulses. Consequently, both reflections that travel uphole as well as the initial acoustic waveform travelling downhole can be identified within the data after matched filtering. With matched filtering, it may be possible to detect acoustic events in hostile environments with SNRs of 0 dB or less. This corresponds to reflections in graph 300 of FIG. 7 which cannot be identified by the naked eye.

For the enhanced waterfall plot (operation 3), the matched filtering results may be used to generate a waterfall image. Here, each line corresponds to the outcome of the matched filtering operation for a single channel. An enhanced waterfall plot may, for example, reduce or eliminate the horizontal streaks in graph 300 of FIG. 7 and thus facilitate identification of reflections buried beneath the noise floor.

Figure 9A:
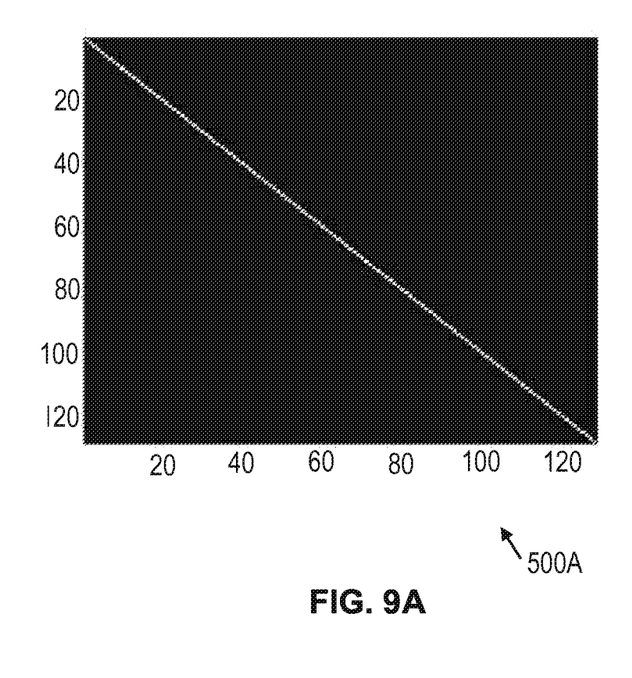
FIGS. 9A-9C are graphs showing an illustrative image processing scenario.
Figure 9B:
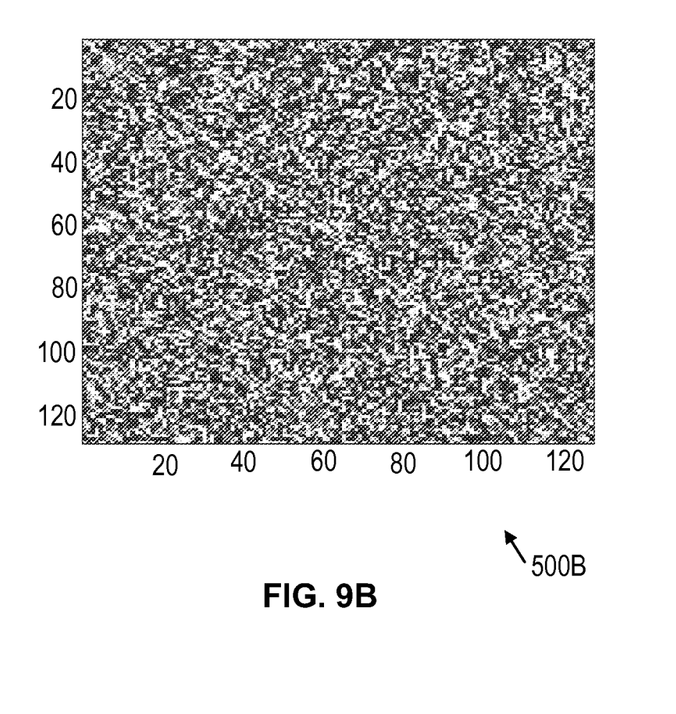
Figure 9C:
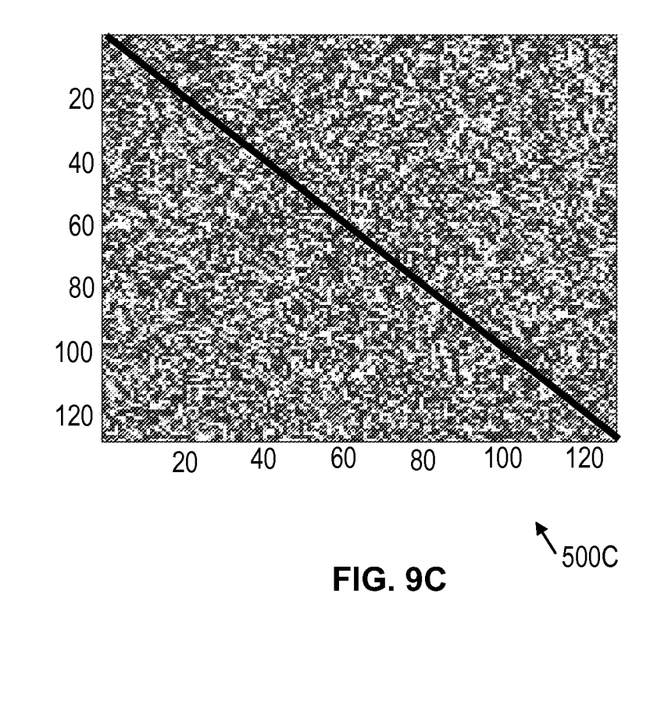

For the image processing (operation 4), a matched filter waterfall plot may be converted to a binary color format using a suitable thresholds (static or adaptive). This will result in a black and white image that only exhibits the potential locations of the acoustic waveform along the wellbore. Next, straight lines corresponding to the trajectory of the acoustic waveform can be extracted Hough transformation. The potential of the Hough transformation in extracting lines from images is illustrated in FIG. 9A-9C. More specifically, graph 500A of FIG. 9A shows an original grayscale image, while graph 500B of FIG. 9B shows the original grayscale image with Gaussian noise superimposed. In 500C of FIG. 9C, a line associated with the original grayscale image is detected based on a Hough transformation and is highlighted. In at least some embodiments, the Hough transformation can be further "tuned" to find only those line segments whose angle corresponds to the propagation speed of the acoustic wave, making the proposed methodology very robust against false detection results. Finally, by finding the intersection points between the extracted lines (indicated by the circles in graph 300 of FIG. 7), the exact locations of the reflections are obtained. If the intersection points correspond to expected acoustic impedance boundaries, they can be ignored or used for mapping verification. On the other hand, if an intersection point corresponds to an unexpected acoustic impedance boundary, an anomaly designation is associated with the intersection point. Over time, intersection point tracking and analysis (e.g., reflection intensity analysis) can be performed. Further, fluid flow rates and/or pressure measurements may be used to identify a volume or a volume rate of change for each particular acoustic impedance boundary anomaly.

Figure 10:
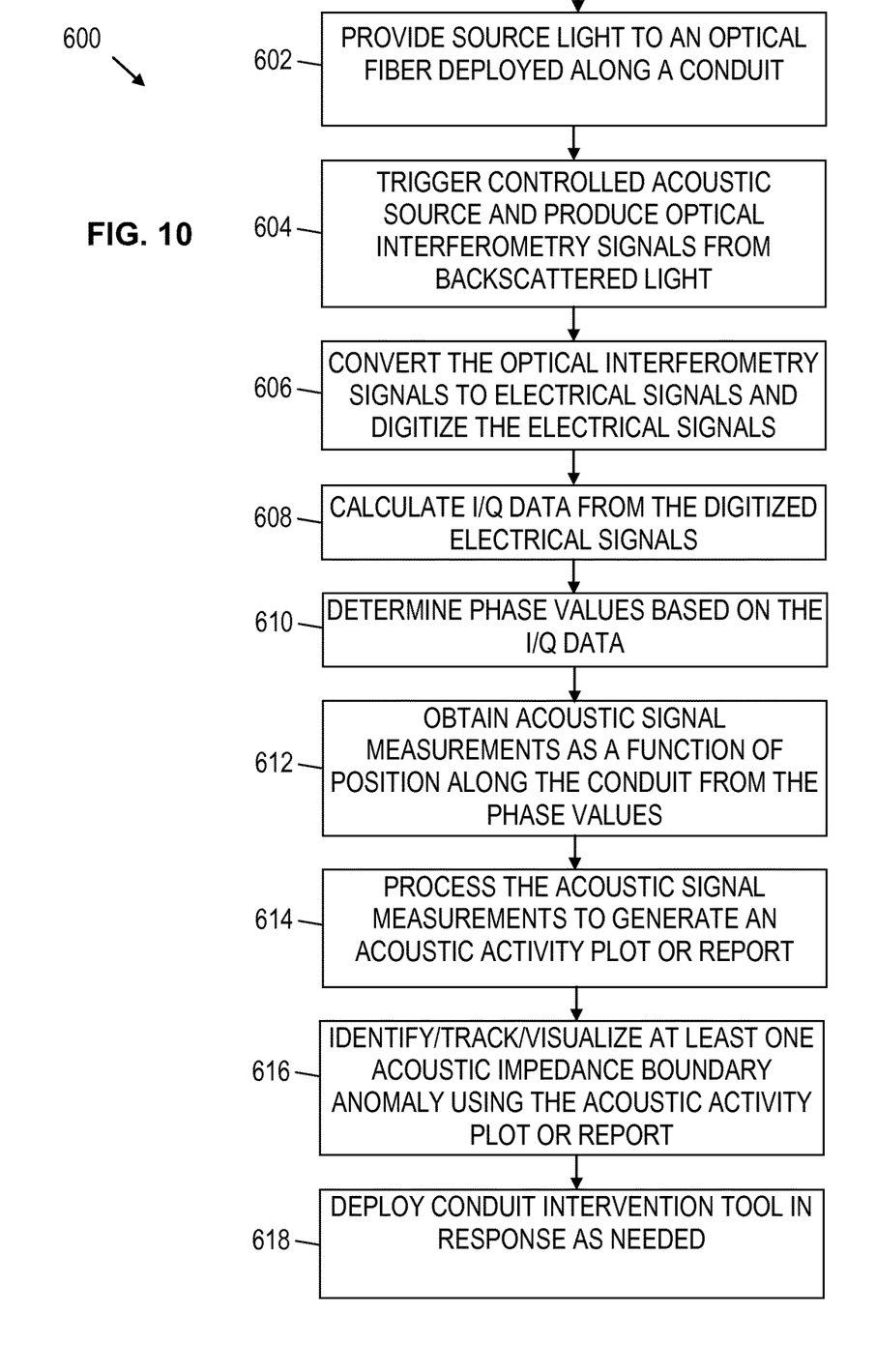
FIG. 10 is a flowchart of an illustrative method.

FIG. 10 is a flowchart of an illustrative method 600. In method 600, source light is provided to an optical fiber deployed in along a cased wellbore at block 602. At block 604, backscattered light is received from the optical fiber and optical interferometry signals are produced (e.g., A, B, C, or X, Y, Z). At block 606, the optical interferometry signals are converted to electrical signals and the electrical signals are digitized. At block 608, I/Q data is calculated from the digitized electrical signals. At block 610, phase values are determined based on the I/Q data. At block 612, acoustic signal measurements as a function of position along the cased wellbore are obtained from the phase values. At block 614, the acoustic signal measurements (or values derived from the acoustic signal measurements) are processed to generate an acoustic activity plot or report. As desired, the operations of block 614 may involve matched filtering and/or image processing to generate or enhance the acoustic activity plot or report. At block 616, at least one acoustic impedance boundary anomaly is identified, tracked, or visualized using the acoustic activity plot or report. At block 618, a conduit intervention tool (e.g., to fish an object, to remove a deposit, to adjust a profile of the conduit) is deployed as needed. For example, the conduit intervention tool may be deployed in response to determining that a volume or volume rate of change for an acoustic impedance boundary anomaly has exceeded a threshold.

The disclosed techniques offer various advantages over other techniques such as pulse-echo time-of-flight analysis or wireline tools. Relative to pulse-echo time-of-flight techniques, the disclosed techniques detect reflections locally before attenuation or distortion. Further, the spatial resolution is comparatively high. Relative to wireline tools, the disclosed techniques to identify, track, and/or visualize an acoustic impedance boundary anomaly are possible without intervention (a well does not have stop producing to apply the disclosed techniques). Further, the disclosed techniques will work over longer pipe lengths and is effective in presence of extreme pressures or temperatures. Further, the disclosed techniques will work in horizontal completions or pipelines where it is problematic to run wireline tools.

Embodiments disclosed herein include:

A: A system that comprises a controlled acoustic source. The system also comprises distributed acoustic sensors along a conduit, wherein the distributed acoustic sensors obtain acoustic signal measurements as a function of position along the conduit in response to at least one acoustic signal output by the controlled acoustic source. The system also comprises a processing unit that generates an acoustic activity plot or report based on the acoustic signal measurements, wherein the acoustic activity plot or report is used to identify at least one acoustic impedance boundary anomaly as a function of position along the conduit.

B: A method that comprises obtaining acoustic signal measurements as a function of position along a conduit using a controlled acoustic source and distributed acoustic sensors. The method also comprises generating an acoustic activity plot or report based on the acoustic signal measurements. The method also comprises identifying at least one acoustic impedance boundary anomaly as a function of position along the conduit based on the acoustic activity plot or report.

Each of embodiments A and B may have one or more of the following additional elements in any combination: Element 1: wherein the processing unit performs a matched filtering operation to generate or enhance the acoustic activity plot or report. Element 2: wherein the processing unit performs an image processing operation to generate or enhance the acoustic activity plot or report. Element 3: wherein the image processing operation involves a Hough transformation. Element 4: wherein the conduit comprises a cased wellbore. Element 5: wherein the conduit comprises a subsea conduit. Element 6: wherein the controlled acoustic source is located at earth's surface. Element 7: wherein the conduit includes an acoustic impedance boundary with a known position, and wherein the processing unit calibrates an acoustic velocity value used to identify the at least one acoustic impedance boundary anomaly based on the known position. Element 8: wherein the processing unit processes acoustic signal measurements or values derived from the acoustic signal measurements over time to track volume of the at least acoustic impedance boundary anomaly as a function of time. Element 9: wherein the processing unit causes a warning to be triggered in response to the volume or a rate of change of the volume exceeding a threshold. Element 10: wherein the distributed acoustic sensors comprise an optical fiber in communication with a surface interface that performs interferometry analysis of backscattered light. Element 11: further comprising a monitor in communication with the processing unit, wherein the processing unit causes the monitor to display the acoustic activity plot or report.

Element 12: further comprising performing a matched filtering operation to generate or enhance the acoustic activity plot or report. Element 13: further comprising performing an image processing operation to generate or enhance the acoustic activity plot or report. Element 14: wherein the image processing operation involves a Hough transformation. Element 15: further comprising calibrating an acoustic velocity value used to identify the at least one acoustic impedance boundary anomaly based on a separate acoustic impedance boundary with a known position along the conduit. Element 16: further comprising estimating a volume or change in volume of the at least one acoustic impedance boundary anomaly. Element 17: wherein the distributed acoustic sensors comprise an optical fiber, and wherein said obtaining comprises performing interferometry analysis of backscattered light. Element 18: further comprising displaying the acoustic activity plot or report.

Numerous variations and modifications will become apparent to those skilled in the art once the above disclosure is fully appreciated. It is intended that the following claims be interpreted to embrace all such variations and modifications.

What is claimed is:

1. A system to determine at least one acoustic impedance boundary anomaly, the system comprising:
   a controlled acoustic source attached to a conduit which generates a series of acoustic pulses with a known signature at a wellhead and sends the series of acoustic pulses downhole in the conduit;
   distributed acoustic sensors (DAS) along the conduit comprising a fiber optic cable, wherein the DAS obtain observed data of reflected acoustic pulses in a data stream traveling uphole in the conduit in at least one DAS data channel of a plurality of DAS data channels of the DAS; and
   a processing unit that:
      finds locations of the acoustic pulses in the conduit within each of the at least one DAS data channel of the plurality of DAS data channels using a matched filtering operation in which the series of acoustic pulses with the known signature generated by the controlled acoustic source is cross-correlated with the observed data of the reflected acoustic pulses;
      assembles results of the matched filtering operation for each of the at least one DAS data channel of the plurality of DAS data channels resulting in an enhanced waterfall plot;
      applies image processing techniques on the enhanced waterfall plot to find bifurcation points of primary reflections of the series of acoustic pulses with the known signature travelling downhole in the conduit, wherein straight lines corresponding to a trajectory of the reflected acoustic waveform are extracted using a Hough transform from the observed data of the reflected acoustic pulses to find the bifurcation points which correspond to points-of-origin of the primary reflections; and identifies at least one acoustic impedance boundary anomaly as a function of position along the conduit based on the identified locations of the bifurcation points, wherein the at least one acoustic impedance boundary anomaly corresponds to unexpected changes in a diameter of the conduit or unexpected objects along the conduit.

2. The system of claim 1, wherein the conduit comprises a cased wellbore.

3. The system of claim 1, wherein the conduit comprises a subsea conduit.

4. The system of claim 1, wherein the controlled acoustic source is located at earth's surface.

5. The system of claim 1, wherein the conduit includes an acoustic impedance boundary with a known position, and wherein the processing unit calibrates an acoustic velocity value used to identify the at least one acoustic impedance boundary anomaly based on the known position.

6. The system of claim 1, wherein the processing unit processes acoustic signal measurements or values derived from the acoustic signal measurements over time to track volume of the at least acoustic impedance boundary anomaly as a function of time.

7. The system of claim 6, wherein the processing unit causes a warning to be triggered in response to the volume or a rate of change of the volume exceeding a threshold.

8. The system according to claim 1, wherein the optical fiber is in communication with a surface interface that performs interferometry analysis of backscattered light.

9. The system according to claim 1, further comprising a monitor in communication with the processing unit, wherein the processing unit causes the monitor to display the enhanced waterfall plot.

10. A method to determine at least one acoustic impedance boundary, the method comprising:
generating a series of acoustic pulses with a known signature at a wellhead;
sending the series of acoustic pulses downhole in a conduit;
finding locations of the acoustic pulses in the conduit within each of at least one distributed acoustic sensor (DAS) data channel of a plurality of DAS data channels using a matched filtering operation in which the series of acoustic pulses with the known signature generated by the controlled acoustic source is cross-correlated with the observed data of the reflected acoustic pulses;
assembling results of the matched filtering operation for each of the at least one DAS data channel of the plurality of DAS data channels resulting in an enhanced waterfall plot;
applying image processing techniques on the enhanced waterfall plot to find bifurcation points of primary reflections of the series of acoustic pulses with the known signature travelling downhole in the conduit, wherein straight lines corresponding to a trajectory of the reflected acoustic waveform are extracted using a Hough transform from the observed data of the reflected acoustic pulses to find the bifurcation points which correspond to points-of-origin of the primary reflections; and
identifying at least one acoustic impedance boundary anomaly as a function of position along the conduit based on the identified locations of the bifurcation points, wherein the at least one acoustic impedance boundary anomaly corresponds to unexpected changes in a diameter of the conduit or unexpected objects along the conduit.

11. The method of claim 10, further comprising calibrating an acoustic velocity value used to identify the at least one acoustic impedance boundary anomaly based on a separate acoustic impedance boundary with a known position along the conduit.

12. The method of claim 10, further comprising estimating a volume or change in volume of the at least one acoustic impedance boundary anomaly.

13. The method according to claim 10, wherein the reflected acoustic pulses are obtained by performing interferometry analysis of backscattered light.

14. The method according to claim 10, further comprising displaying the enhanced waterfall plot.

* * * * *

UNITED STATES PATENT AND TRADEMARK OFFICE
CERTIFICATE OF CORRECTION

PATENT NO.         : 12,037,892 B2
APPLICATION NO.    : 15/569464
DATED              : July 16, 2024
INVENTOR(S)        : Christopher Lee Stokely et al.

Page 1 of 1

It is certified that error appears in the above-identified patent and that said Letters Patent is hereby corrected as shown below:

In the Specification

In Column 9, Line 62, after --may be-- delete ")"

Signed and Sealed this
Twenty-seventh Day of August, 2024

Katherine Kelly Vidal
*Director of the United States Patent and Trademark Office*